(No Model.)
J. H. HEWEY.
AXLE LUBRICATOR.
No. 388,359. Patented Aug. 21, 1888.
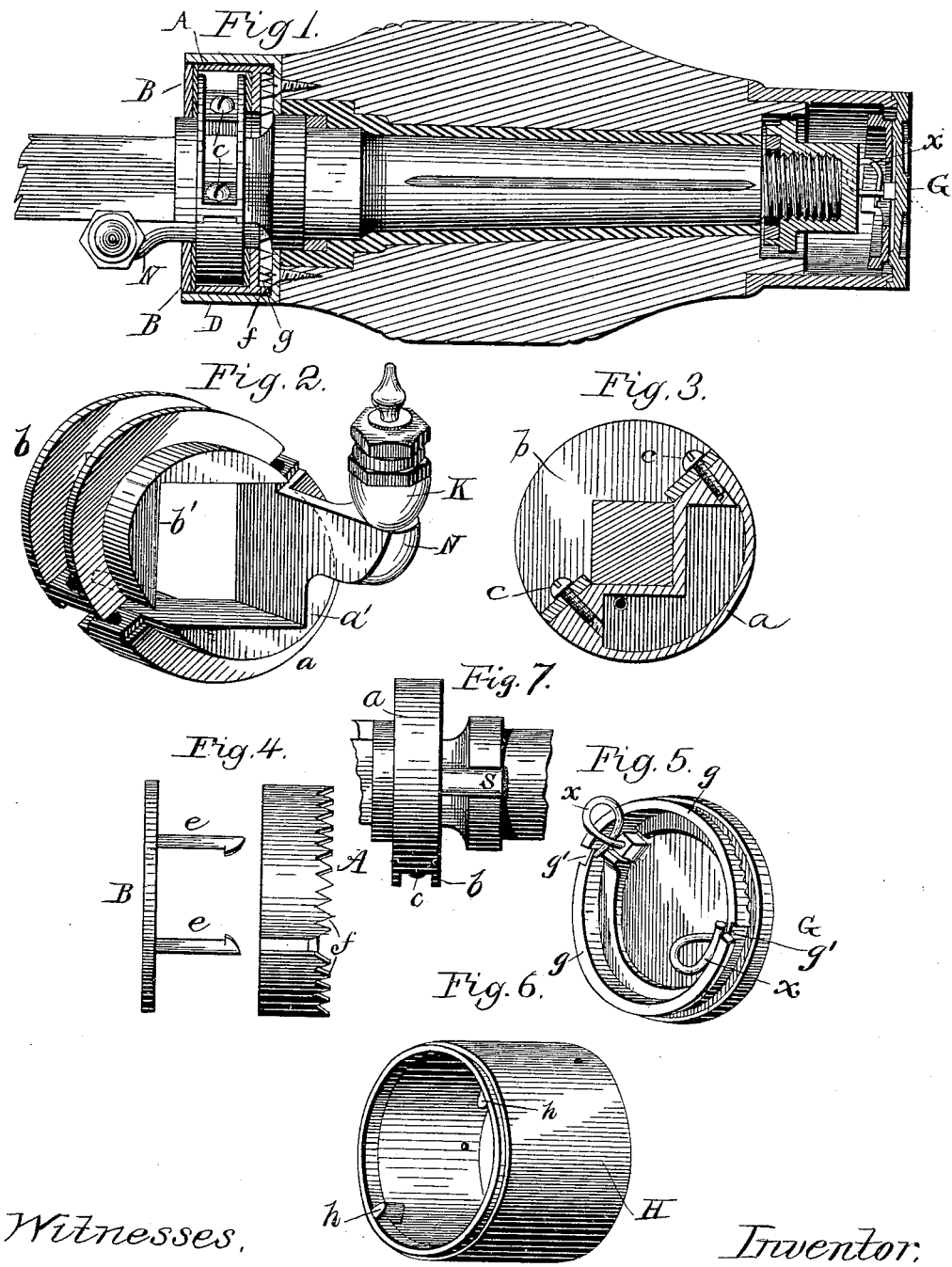
Witnesses,
Inventor:
James H. Hewey.

UNITED STATES PATENT OFFICE.

JAMES H. HEWEY, OF VIROQUA, ASSIGNOR OF ONE-HALF TO HARLAN P. PROCTOR, OF VERNON COUNTY, WISCONSIN.

AXLE-LUBRICATOR.

SPECIFICATION forming part of Letters Patent No. 388,359, dated August 21, 1888.

Application filed September 5, 1887. Serial No. 249,044. (No model.)

*To all whom it may concern:*

Be it known that I, JAMES H. HEWEY, a citizen of the United States, residing at the city of Viroqua, in the county of Vernon and State of Wisconsin, have invented a new and useful Combined Self-Feeding Lubricator-Box and Sand, Dust, and Mud Excluder, to be attached to the axles and wheels of carriages, wagons, and other wheeled vehicles, and for which invention I did, on the 5th day of September, 1887, make and file in the Patent Office of the United States my application, Serial No. 249,044, for a patent, and of which invention the following is an amended specification.

My invention relates to improvements in boxes made in separate parts and attached to the axles of wheeled vehicles for excluding sand, dust, and mud from contact with the spindle of the axle, and in combination therewith to provide a self-regulating lubricator-box; and the objects of my improvement are to provide a box, parts of which are attached to the axle and other parts attached to the hub of the wheel, and so used in conjunction as to effectually exclude sand, dust, and mud from the spindle of the axle; also to provide for the lubrication of the spindle of the axle without removing the wheel from the axle, and in connection therewith to provide an improved fastening to the cap or cover to the point-band of wheels to prevent the leakage of the lubricator from the point-band of the wheel. I attain these objects by the mechanism illustrated in the accompanying drawings, in which—

Figure 1 is a view, partly in elevation and partly in vertical longitudinal section, of part of an axle, the spindle of an axle, and the hub of a wheel, with the different parts of the lubricator-box and the sand, dust, and mud excluder in position, and also the rim or collar on inside of point-band to keep the cover in position. Fig. 2 is a perspective view of the lubricator-box detached from the axle. Fig. 3 is a view of a portion of an axle, inside elevation, with the lubricator-box in sections in position, and showing the different parts for fastening the sections together and keeping them in position on the axle. Fig. 4 is a view of the revolving collar A and B in side elevation and the keys for interlocking same. Fig. 5 is an upper view of the concave rim or collar on inside of point-band cover, showing the ratcheted incline and the springs which hold the rim or collar to the cover. Fig. 6 is a view of point-band, showing the lugs on inside of point-band to keep the cover in position. Fig. 7 is a top plan in detail showing lubricator-duct and wick and their relation to the axle, &c.

The lubricator-box, Fig. 2, is formed of two pieces or sections, *a* and *b*, and are of metal. The piece or section *a* is cast hollow and forms the box for the lubricator. On the outer side of this section *a* is an elbow-shaped nozzle, N, cast with the section and intended to receive the cup or conductor K for conveying the lubricant to the box. On the inside of section *a* projects a spout, S, the point of which is inserted in a groove made in the permanent collar of the axle to receive same, the point of the spout terminating in this groove and intended to carry the lubricant from the box to the spindle of the axle, thus avoiding the removal of the wheel from the spindle of the axle for lubricating purposes.

The revolving collar A is of metal cast in one piece, circular in form, and having a serrated flange, *f*, on the side which is placed nearest and toward the wheel when in position, and intended to fit a similar serrated flange, *g*, on the inside of cap D, hereinafter referred to. The opening in the center of the collar A is sufficiently large to allow the collar to revolve around the axle. A slit or opening is left in and along opposite sides of revolving collar A to receive keys *e e*, inserted in collar B, for interlocking collars A and B. The revolving collar B is also of metal and circular in form, cast in one piece, the center having circular opening sufficiently large to allow the same to revolve around the shoulders *a' b'* of sections *a* and *b* of the lubricator-box. Keys *e e* are inserted in opposite sides of collar B, and intended to pass along the slits or openings left on opposite sides of collar A. These keys are inserted near the outer edge of this collar and riveted, but allowed to revolve. The ends of these keys have a clutch, as shown in drawings, which engages, when the revolving collars A and B are interlocked, the shoulders in flange $f$ of collar A at the base of the slits or opening in the sides thereof.

The cap or cover D is of metal, having a serrated flange, $g$, on the inside, as shown in drawings. The flange $g$ is cast with the cap or cover and intended to fit the serrated flange $f$ when in position. The cap or cover D is fastened by screws to the inner end of the hub of the wheel.

In fitting and attaching the combination to carriages, wagons, and other wheeled vehicles, the revolving collar B, with washer attached, and the keys $e\ e$, pointing toward the spindle of the axle, is first placed on the axle in the rear of the permanent collar, and then the two sections $a$ and $b$ of the lubricator-box are placed on the axle, also in the rear of the permanent collar, section $a$, with the spout S toward the permanent collar, partly on the under side of the axle, and the part with the spout on the front or rear side of the axle and with the elbow-shaped nozzle N pointing upward, and section $b$ on the opposite or reverse sides of the axle to section $a$.

The spout of section $a$, into which lamp-cotton is placed to regulate the flow of the lubricant, is dropped into a groove made in the permanent collar of the axle, but not extending beyond the permanent collar. And the two sections $a$ and $b$ are drawn together and kept in position on the axle by means of the screws $c\ c$, Fig. 3, and thus become stationary and form the lubricator-box. A cup or conductor, K, having a screw-top, is screwed into the top of the elbow-shaped nozzle outside of revolving collar B. The lubricant is poured into the cup or conductor K and, through the elbow-shaped nozzle, enters the lubricator-box. The spout conveys same to the spindle of the axle and the lamp cotton regulates the flow of the lubricator. The revolving collar A, with the serrated flange $f$ nearest the spindle of the axle and a washer fitting the inside of the collar, are then placed on the axle, covering the lubricator-box. The collars A and B are then drawn together by the keys $e\ e$ in the side opening of collar A. These keys are then turned until the clutches fit the shoulders in the flange $f$ and interlock the collars, as shown in Fig. 4. The sand, dust, and mud excluder is then in position, and when the wheel is placed on the spindle of the axle the serrated flange $g$ in the cap or cover D fits into the serrated flange $f$ of collar A. The turning of the wheel causes the collars A and B to revolve with the wheel inside of and in conjunction with the cap or cover D. In connection with the excluder above described is an improved fastening to the cap or cover of point-bands to prevent the escape of the lubricant from the spindle of the axle. This fastening, Fig. 5, consists of a concave rim or collar, G, firmly secured to the inside of the cap or cover by two springs, $x$, as shown in drawings. The rim or collar G has two inclines on the side nearest the cap or cover. These inclines $g$ start from opposite sides of the rim or collar and extend in the same direction around the rim, but do not overlap or reach each other, terminating so as to leave an opening, $g'$, on each side to permit the rim or collar to enter the point-band H and pass small lugs $h$, Fig. 6, placed on opposite inner sides of the said point-band. These inclines are ratcheted on the under side or side nearest the point-band cover, as shown in drawings. The cap or cover is turned from the outside, the lugs in the point-band entering between the starting-point of one incline and the termination of the other inclines, and in turning the cap or cover the rim or collar G binds on the lugs in point-band, Fig. 6, and the ratcheted inclines hold the cap or cover in position and prevent the same from becoming loose by the motion or jarring of the wheel.

I am aware that prior to my invention self-lubricating boxes for carriages have been in use, that a cap or cover similar to cap D is old, that sectional interlocking sand-bands are old, and that caps or covers for sand-bands or point bands have also been in use, and I do not broadly claim any such features; but What I do claim as my own invention is—

1. The sections $a$ and $b$, with the nozzle and spout, and the cup or conductor forming the self-feeding lubricator-box, for the purpose described.

2. The revolving collars A and B and keys $e\ e$, for interlocking the same, substantially as shown and described.

3. The flanges $f$ and $g$ on outside of revolving collar A and inside of cap D, which cause the interlocked collars A and B to revolve with the wheel, as hereinbefore set forth.

4. In combination with the point-band, its cover, and the collar G, secured thereto by springs $x$ and having two inclines on its face with opening $g'$ on each side between them, substantially as and for the purposes set forth.

5. The combination of the self-feeding lubricator-box, the revolving collar A, with serrated flange $f$, also revolving collar B, with keys $e\ e$, for interlocking the two collars A and B, the wheel-hub and cap with serrated flange $g$, and the rim or collar G, Fig. 5, substantially as set forth.

JAMES H. HEWEY.

Witnesses:
O. R. SKAAR,
C. A. ROBERTS.